United States Patent
Loefstrand (10) Patent No.: US 8,001,214 B2
(45) Date of Patent: Aug. 16, 2011

(54) METHOD AND SYSTEM FOR PROCESSING A REQUEST SENT OVER A NETWORK

(75) Inventor: Jan Mikael Markus Loefstrand, Torslanda (SE)

(73) Assignee: Oracle America, Inc., Redwood City, CA (US)

( * ) Notice: Subject to any disclaimer, the term of this patent is extended or adjusted under 35 U.S.C. 154(b) by 361 days.

(21) Appl. No.: 12/370,481

(22) Filed: Feb. 12, 2009

(65) Prior Publication Data

US 2010/0205240 A1 Aug. 12, 2010

(51) Int. Cl.
*G06F 15/16* (2006.01)

(52) U.S. Cl. ......... 709/217; 709/223; 709/226; 370/328

(58) Field of Classification Search .................. 709/217, 709/226, 223; 370/328
See application file for complete search history.

(56) References Cited

U.S. PATENT DOCUMENTS

| | | | | |
|---|---|---|---|---|
| 6,862,624 B2 * | 3/2005 | Colby et al. | .................. | 709/226 |
| 7,089,293 B2 * | 8/2006 | Grosner et al. | ............... | 709/217 |
| 7,313,614 B2 * | 12/2007 | Considine et al. | ............ | 709/223 |
| 2009/0185522 A1 * | 7/2009 | Periyalwar et al. | ........... | 370/328 |

OTHER PUBLICATIONS

Amir, Yair, et al., "N-Way Fail-Over Infrastructure for Reliable Servers and Routers", John Hopkins University, Computer Science Department, Jun. 2003, (10 Pages).
Amir, Yair, et al., "The Wackamole Approach to Fault Tolerant Networks Demo", John Hopkins University, Computer Science Department, DISCEX 2003, (2 Pages).

* cited by examiner

*Primary Examiner* — Tammy T Nguyen
(74) *Attorney, Agent, or Firm* — Osha • Liang LLP (57) ABSTRACT

A method for processing a request sent over a network. The method includes receiving a first request sent by a client over the network at a physical server hosting a first application. The method further involves processing the first request using the first application to generate a second request. The method further involves the addressing and sending of the second request to a software-implemented distributed service delivery controller (SDC) on the physical server, where a loopback interface Internet Protocol (IP) address and a port associated with the distributed service delivery controller (SDC) are used to address the second request. The method further involves determining, using the distributed SDC, an IP address for a destination server hosting the second application. The method further involves processing the second request on a network layer of a network protocol stack of the physical server and sending the second request to the destination server.

4 Claims, 8 Drawing Sheets

FIGURE 8

METHOD AND SYSTEM FOR PROCESSING A REQUEST SENT OVER A NETWORK

BACKGROUND

To remain competitive in an increasingly information-rich business culture, organizational entities in a variety of markets routinely generate, maintain, and use data through the course conducting business. In providing information technology services directed toward facilitating those needs, data centers house networked server infrastructure allowing for the efficient management of organizational data. The physical devices that makeup data center infrastructure impose various costs: a cost with respect to purchase price; a cost with respect to electricity consumption; a cost with respect to physical space taken. As such, data centers have an interest in scaling their infrastructure to offer services with these costs in mind.

SUMMARY

In general, in one aspect, the invention relates to a method for processing a request sent over a network and involves receiving, by an instance of a first application hosted on a physical server, a first request sent by a client over the network. The method further involves processing the first request, using the instance of the first application, to generate a second request for processing by an instance of a second application. The method further involves sending the second request to an instance of a distributed service delivery controller (SDC) on the physical server, wherein the distributed SDC is implemented in software and the second request is addressed to a loopback interface Internet Protocol (IP) address and a port associated with the distributed SDC. The method further involves determining, using the instance of the distributed SDC, a destination IP address for a destination server hosting the instance of the second application. The method further involves processing the second request on a network layer of a network protocol stack of the physical server and sending the processed second request to the destination server.

In general, in one aspect, the invention relates to a system for processing a request sent over a network comprising a physical server, wherein the physical server comprises: an instance of a first application hosted on a virtual machine executing on the physical server, wherein the instance of the first application is configured to receive and process a first request to generate a second request for processing by an instance of a second application. The physical server further comprises an instance of a distributed SDC hosted on the virtual machine executing on the physical server, wherein the distributed SDC comprises: a service access point component configured to receive the second request and to process the second request when the port to which the second request is addressed corresponds with a port associated with the distributed SDC; a service routing component configured to determine a destination server hosting the instance of the second application; a destination host addressing component configured to determine a destination port and a destination IP address for the destination server, wherein the physical server is configured to process the second request using a network protocol to obtain the processed second request, wherein the physical server is further configured to send the processed second request to the destination server. The physical server further comprises the destination server, wherein the destination server comprises: the instance of the second application hosted on the destination server, wherein the instance of the second application is configured to receive and process the second request, and wherein the instance of the second application is further configured to generate and send a response to the physical server as a function of processing the second request.

Other aspects of the invention will be apparent from the following description and the appended claims.

DETAILED DESCRIPTION

Specific embodiments of the invention will now be described in detail with reference to the accompanying FIGs. Like elements in the various FIGs. are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for processing a request sent over a network. In particular, embodiments of the invention are directed to providing service routing functionality which enables processing across multiple tiers of a network data center in satisfaction of the request.

Figure 1:
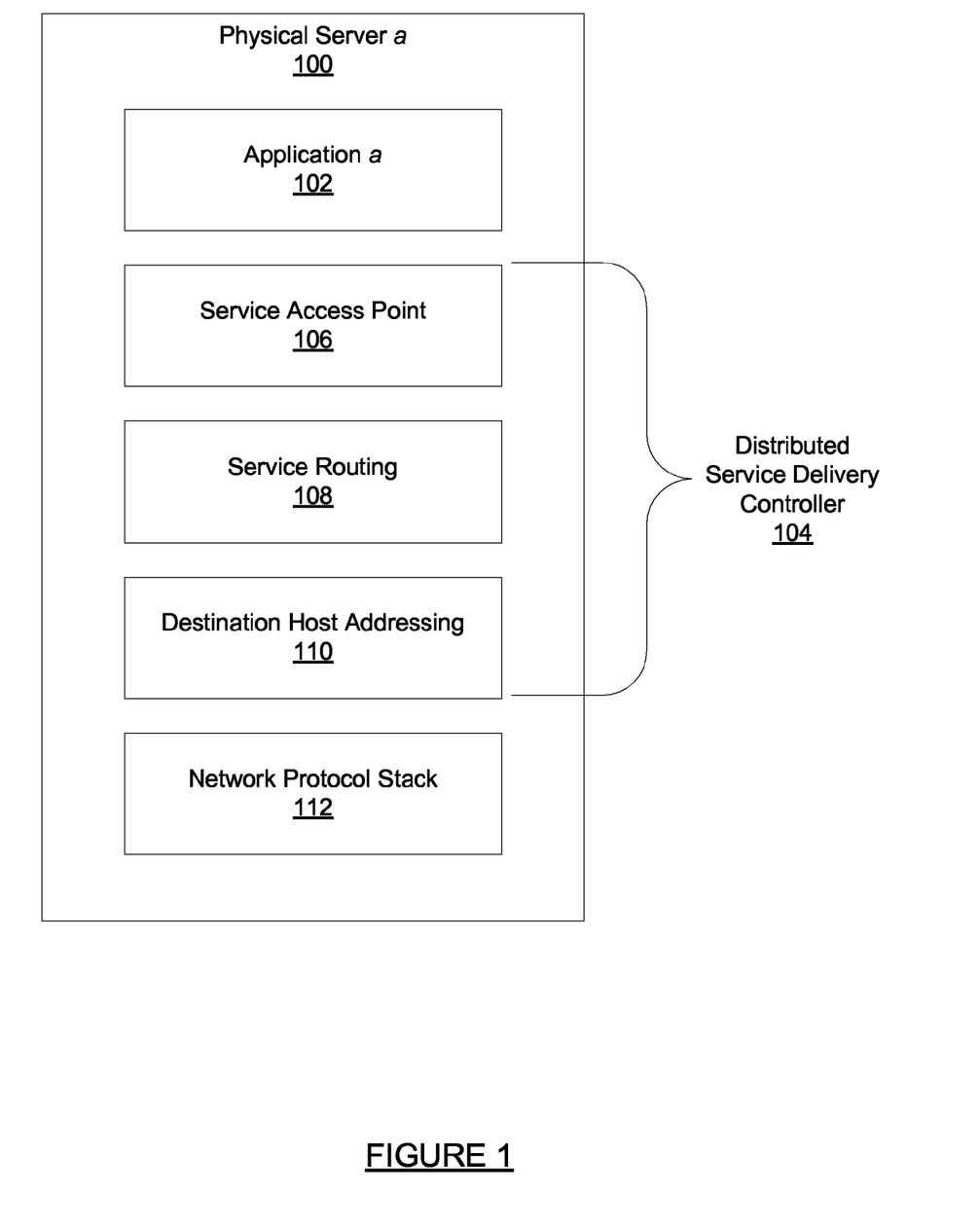
FIG. 1 shows a component of a system in accordance with one or more embodiments of the invention.

FIG. 1 shows a component of a system in accordance with one or more embodiments of the invention. Specifically, FIG. 1 shows a physical server (100).

In one or more embodiments of the invention, the physical server (100) is a computer hosting one or more software applications configured to process requests received over a network. The physical server (100) includes an instance of a first software application depicted as Application a (102), an instance of a distributed service delivery controller (SDC) (104), and a network protocol stack (112). The physical server (100) is configured to receive a request sent by a client over a network (not shown). The physical server (100) is further configured to process the received request using an instance of Application a (102). As a result of processing the received request using the instance of Application a (102), a new request is generated. The physical server (100) is further configured to determine, using an instance of the distributed SDC (104), a destination IP address for a destination server (not shown) that is to receive the new request. In one or more embodiments of the invention, other unique attributes may be determined in addition to the destination IP address to specify the destination for the new request. An example of an additional unique attribute may be a destination port. The destination server also processes the new request using an instance of a second software application. As such, the physical server (100) is further configured to send the new request to the destination server hosting an instance of the second software application.

The distributed SDC (104) includes three components: a service access point component (106), a service routing component (108), and a destination host addressing component (110). Each of these components is described below.

The service access point component (106) is configured to receive the new request generated by an instance of Application a (102). In one or more embodiments of the invention, the new request is addressed with a loopback interface IP address and a port associated with the distributed SDC (104). Because of this address information in the new request, the new request is directed to the service access point component (106). Upon receiving the new request, the service access point component (106) is configured to determine, as a function of the port to which the new request is addressed, whether the new request is processed by the distributed SDC (104) for routing to a destination server.

The service routing component (108) is configured to receive from the service access point component (106) the new request generated by the instance of Application a (102). Having received the new request, the service routing component (108) is further configured to determine a destination server hosting an instance of the second application for routing the new request to. In one or more embodiments of the invention, this determination is made as a function of a service policy. In one or more embodiments of the invention, the service policy is defined by a user. In one or more embodiments of the invention, the service policy is maintained by the distributed SDC (104). The service policy may be, but is not limited to, an algorithm that provides routing, redirection, or load balancing.

The destination host addressing component (110) is configured to receive the new request and the selected destination server from the service routing component (108). The destination host addressing component (110) is further configured to determine the destination port and the destination IP address for the destination server selected by the service routing component (108).

The destination port and destination IP address are then used to address the new request for sending to the destination server. The new request is further processed on a network layer of the network protocol stack (112) associated with the physical server (100).

In one or more embodiments of the invention, the distributed SDC (104) may alternatively execute in a virtualized environment (not shown) hosted on the physical server (100). A discussion pertaining to use of a distributed SDC (104) in virtualized environments will follow later in the specification.

Figure 2:
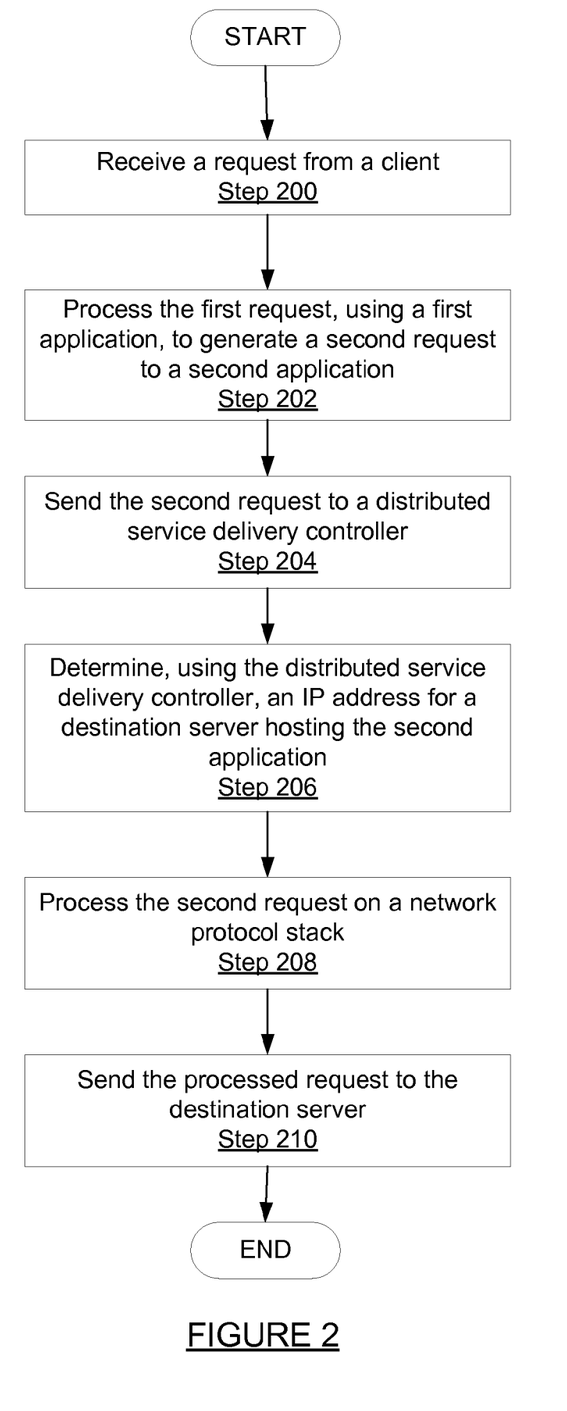
FIGS. 2 and 3 show flowcharts in accordance with one or more embodiments of the invention.
Figure 3:
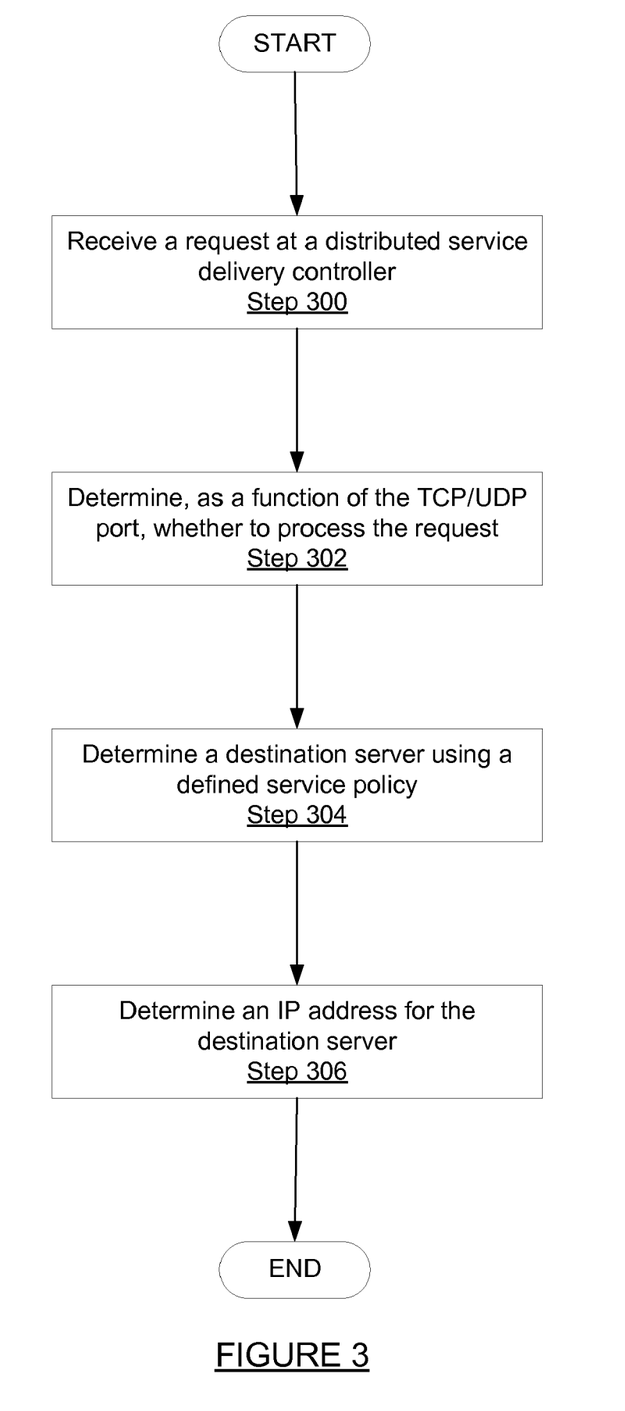

FIGS. 2 and 3 show flowcharts in accordance with one or more embodiments of the invention. While the various steps in these flowcharts are presented and described sequentially, one should appreciate that some or all of the steps may be executed in different orders, may be combined or omitted, and some or all of the steps may be executed in parallel. In addition, steps have been omitted to simplify the presentation.

The process shown in FIG. 2 may be used, for example, to process a request sent over a network directed to a physical server. In Step 200, a first request is received from a client at a physical server. In Step 202, the first request is processed, using an instance of a first application hosted on the physical server, to generate a second request for processing by an instance of a second application. In Step 204, the second request is sent to a distributed SDC also hosted on the physical server. In Step 206, an IP address for a destination server hosting an instance of the second application is determined using the distributed SDC. In one or more embodiments of the invention, other unique attributes may be determined in addition to the destination IP address to specify the destination for the new request. An example of an additional unique attribute may be a destination port, which may be specified using TCP, UDP, or a port specification in accordance with any other transport layer protocol. In Step 208, the second request is processed by a network protocol stack of the physical server. In Step 210, the second request is sent to the destination server designated in Step 206.

FIG. 3 shows a flowchart in accordance with one or more embodiments of the invention. The process shown in FIG. 3 may be used, for example, to process a request using a distributed SDC. In one or more embodiments of the invention, the process shown in FIG. 3 is an elaboration of Step 206 shown in FIG. 2.

In Step 300, a request is received by the distributed SDC. In one or more embodiments of the invention, the request is generated by a first application which addresses the request with an IP address and port associated with the distributed SDC. In Step 302, the distributed SDC determines, as a function of the port to which the request is addressed, whether to process the request. In one or more embodiments of the invention, a TCP port, a UDP port or a port specification in accordance with any other suitable transport layer protocol may be used to address the request. In Step 304, the distributed SDC determines a destination server to receive the request. In one or more embodiments of the invention, the distributed SDC uses a defined service policy to determine which destination server will be the designated recipient of the request. In Step 306, a TCP port and an IP address are determined as a function of the destination server designated in Step 304. The distributed SDC then addresses and transmits the request to the determined destination server.

FIGS. 4, 5, 6, and 7 show examples in accordance with embodiments of the invention. The examples depict at least a client, one or more physical servers, and one or more destination servers. More specifically, the examples shown in FIGS. 4-7 illustrate embodiments of implementing a SDC as shown in FIG. 1. As such, the one or more physical servers constitute a first tier of physical devices used to substantively process a request sent by the client. Further, the one or more destination servers constitute a second tier of physical devices used to provide substantive processing of the request in addition to the first tier physical servers.

Figure 4:
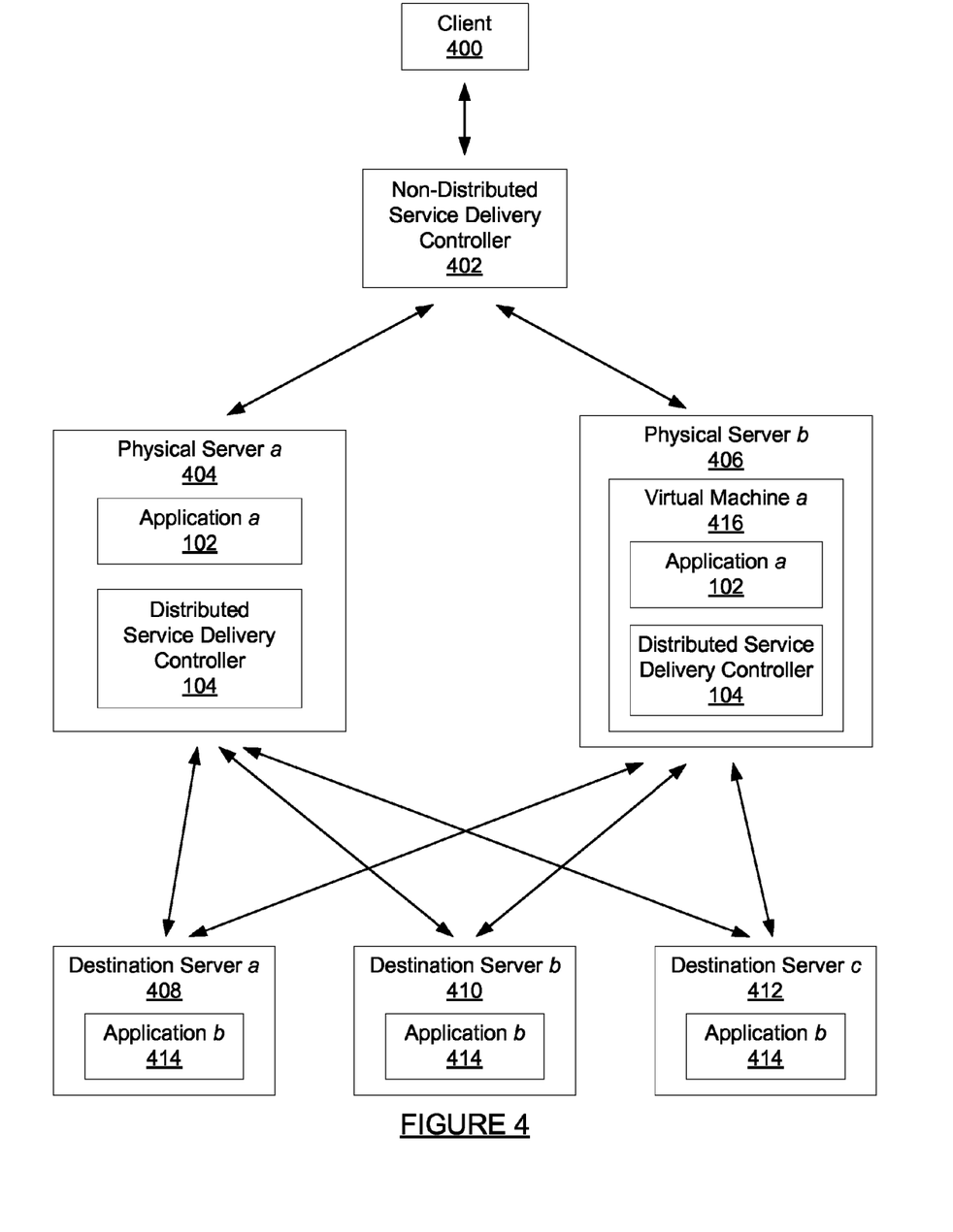
FIGS. 4, 5, 6, and 7 show examples in accordance with one or more embodiments of the invention.

FIG. 4 shows an example in accordance with one or more embodiments of the invention. The components depicted in the example are briefly described below.

The client (400) is configured to send a request over a network to a physical server (404, 406). The client (400) is further configured to receive responses sent over the network by a physical server (404, 406).

The non-distributed SDC (402) is a device that is located in the network communication path. As such, the non-distributed SDC (402) intercepts requests sent over the network. Specifically, the non-distributed SDC (402) is configured to receive and process requests sent over the network for purposes of providing networking functionality (i.e., load balancing, routing, application switching, grid engine firewalls, etc.). Further, as a function of processing the request, the non-distributed SDC (402) is configured to send the processed request to a physical server (404, 406) operatively connected to the network.

The first physical server (404) corresponds with the physical server depicted in FIG. 1. Accordingly, the first physical server (404) hosts an instance of a first software application (102) depicted as Application a and an instance of a distributed SDC (104). Alternatively, in one or more embodiments of the invention as shown with a second physical server (406), both the instance of the first software application (102) and the instance of the distributed SDC (104) may be hosted on a virtual machine (416) executing on a physical server (406).

Examples of virtualization include, but are not limited to, usage of Xen®, VMware®, or any other type of virtual machine environment. (Xen® is a registered trademark of Citrix Systems, Inc. of Fort Lauderdale, Fla.; VMware® is a registered trademark of VMWare, Inc. of Palo Alto, Calif.)

The destination server (408, 410, 412) is configured to receive a request generated by an instance of Application a (102) from a physical server (404, 406). The destination server (408, 410, 412) is further configured to process the received request using an instance of a second application depicted as Application b (414). As a result of processing the received request using the instance of Application b (102), a response is generated. The destination server (408, 410, 412) is further configured to send the generated response to the physical server (404, 406).

Used together, the components of FIG. 4 allow for a response to be generated and sent in answer to a client-issued request: (i) a client (400) sends a request over a network; (ii) the request is received by a non-distributed SDC (402); (iii) the non-distributed SDC (402) determines, as a result of processing the request, a physical server (404, 406) hosting an instance of Application a (102) to which the request may be sent; (iv) the request is sent from the non-distributed SDC (402) to the physical server (404, 406) determined in (iii); (v) an instance of Application a (102), hosted on the physical server (404, 406), processes the received request and determines further processing is required by an instance of Application b (414); (vi) the instance of Application a (102) generates a new request which is addressed and sent using a designated destination port and destination IP address designated to an instance of a distributed SDC (104) also hosted on the physical server (404, 406); (vii) the instance of the distributed SDC (104) receives the new request at its service access point, which confirms the new request for processing by checking that the new request is addressed to the designated destination port; (viii) the service routing component of the distributed SDC (104) determines a destination server (408, 410, 412) hosting an instance of Application b (404) using a defined service policy; (ix) the destination host addressing component of the distributed SDC (104) determines a TCP port and an IP address for the destination server (408, 410, 412) determined in (viii); (x) the new request, having been processed by an instance of the distributed SDC (104) and addressed accordingly, is sent to a network protocol stack associated with the physical server (404, 406); (xi) the new request is sent from the physical server (404, 406) to the destination server (408, 410, 412) determined by the distributed SDC; (xii) the new request is received by the destination server and is processed by an instance of Application b (414); (xiii) the instance of Application b (414) generates a response as a result of processing the received new request; (xiv) the generated response is sent from the destination server (408, 410, 412) to the physical server (404, 406); (xv) the physical server (404, 406) uses the generated response provided by the destination server (408, 410, 412) to respond to the initial client request.

Figure 5:
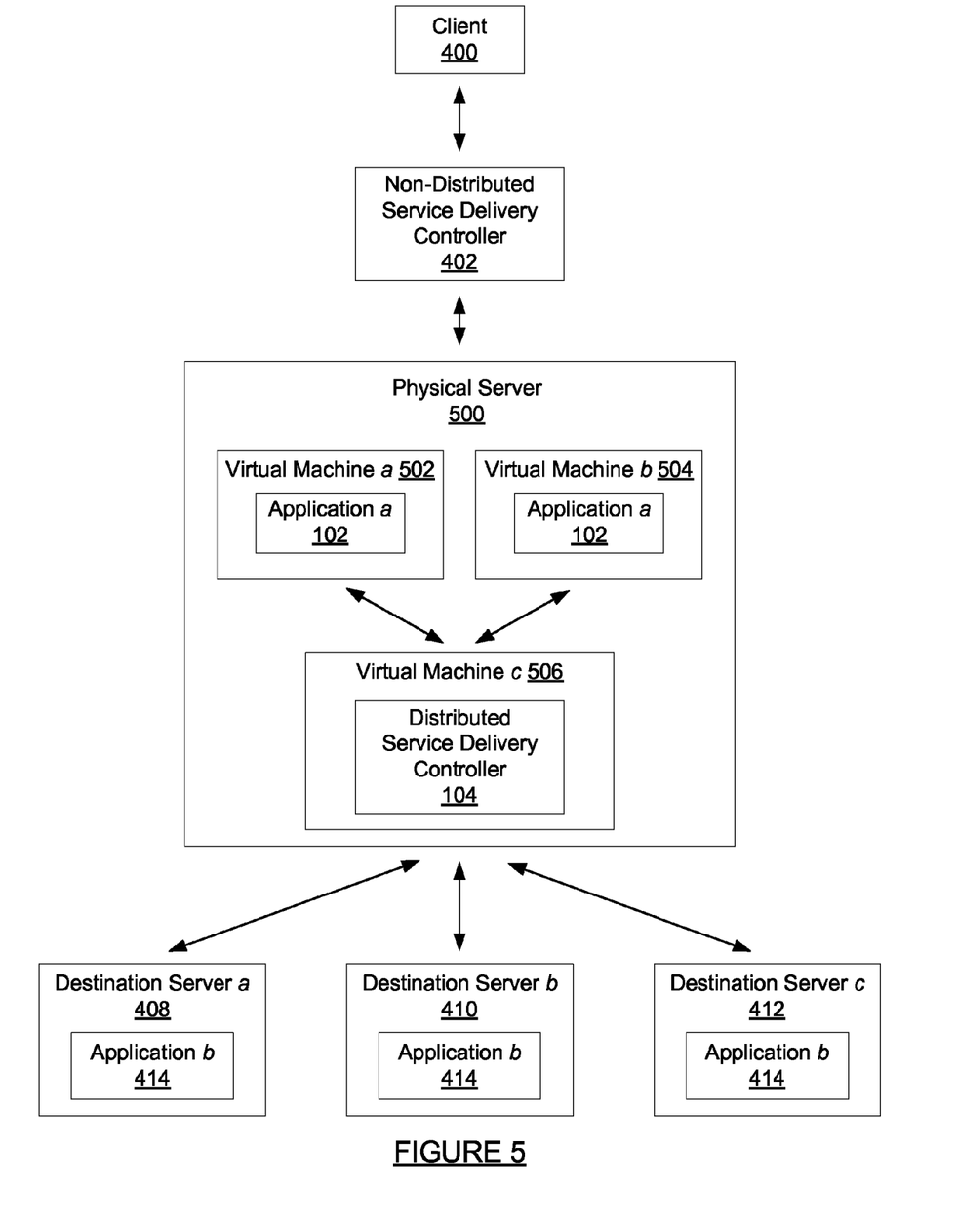

The example of FIG. 5 includes a physical server (500) hosting three virtual machines: Virtual Machine a (502); Virtual Machine b (504); and Virtual Machine c (506). Virtual Machines a and b (502, 504) host a first and second instance of an Application a (102), respectively. Virtual Machine c (506) hosts an instance of a distributed SDC (104). It should be noted that the depicted physical server (500) is but one of many physical servers to which the non-distributed SDC (402) is configured to route requests.

Used together, the components of FIG. 5 allow for a response to be generated and sent in answer to a client-issued request: (i) a client (400) sends a request over a network; (ii) the request is received by a non-distributed SDC (402); (iii) the non-distributed SDC (402) determines, as a result of processing the request, a virtual machine (502, 504) hosting an instance of Application a (102) for sending the request onwards to; (iv) the request is sent from the non-distributed SDC (402) to the physical server (500) that is host to the virtual machine (502, 504) determined in (iii); (v) an instance of Application a (102) processes the received request and determines further processing is required by an instance of Application b (414); (vi) the instance of Application a (102) generates a new request which is addressed and sent using a designated destination port and destination IP address to a virtualized instance of a distributed SDC (104) also hosted on the same physical server (500); (vii) the virtualized instance of the distributed SDC (104) receives the new request at its service access point, which confirms the new request for processing by checking that the new request is addressed to the designated destination port; (viii) the service routing component of the distributed SDC (104) determines a destination server (408, 410, 412) hosting an instance of Application b (404) using a defined service policy; (ix) the destination host addressing component of the distributed SDC (104) determines a TCP port and an IP address for the destination server (408, 410, 412) determined in (viii); (x) the new request, having been processed by the virtualized instance of the distributed SDC (104) and addressed accordingly, is sent to a network protocol stack associated with the physical server (500); (xi) the new request is sent from the physical server (500) to the destination server (408, 410, 412) determined by the distributed SDC; (xii) the new request is received by the destination server and is processed by an instance of Application b (414); (xiii) the instance of Application b (414) generates a response as a result of processing the received new request; (xiv) the generated response is sent from the destination server (408, 410, 412) to the virtual machine (502, 504) hosting the instance of Application a (102) on the physical server (500); (xv) the instance of Application a (102) uses the generated response provided by the destination server (408, 410, 412) to respond to the initial client request.

Figure 6:
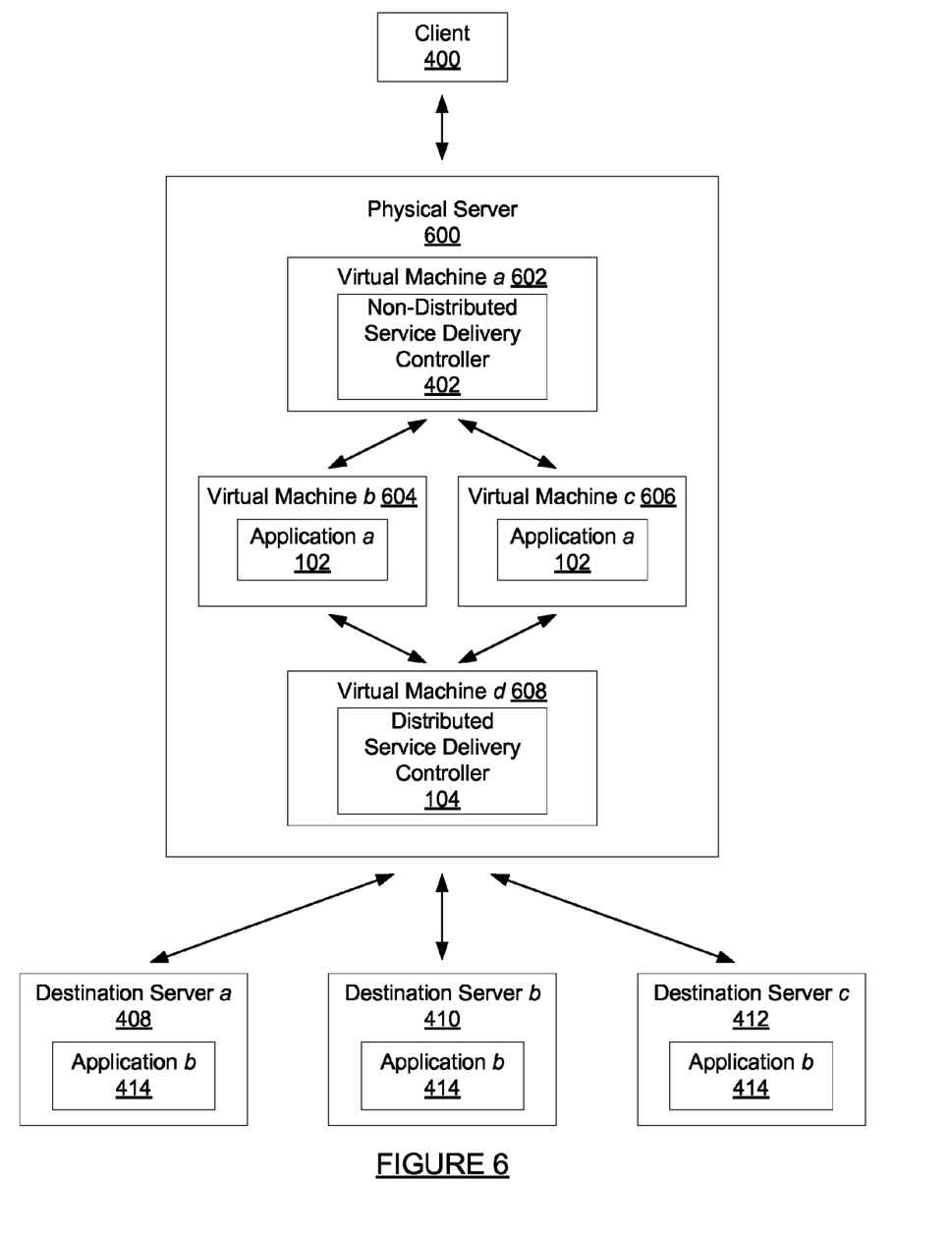

The example of FIG. 6 includes four virtual machines: Virtual Machine a (602); Virtual Machine b (604); Virtual Machine c (606); and Virtual Machine d (608). Virtual Machine a (602) hosts a first instance of a distributed SDC (104). Virtual Machines b and c (604, 606) host a first and second instance of an Application a (102), respectively. Virtual Machine d (608) hosts a second instance of a distributed SDC (104).

Used together, the components of FIG. 6 allow for a response to be generated and sent in answer to a client-issued request: (i) a client (400) sends a request over a network and is received at Virtual Machine a (602) hosted on a physical server (600); (ii) an instance of a non-distributed SDC (402) hosted on Virtual Machine a (602) receives the request at its service access point, which confirms the request for processing by checking that the request is addressed to a particular pre-defined destination port; (iii) the service routing component of the non-distributed SDC (402) determines a virtual machine (604, 606) hosting an instance of Application a (102) using a defined service policy; (iv) the destination host addressing component of the first instance of the non-distributed SDC (402) determines a TCP port and an IP address for sending the request to the virtual machine (604, 606) determined in (iii); (v) the request is appropriately addressed and sent to the virtual machine (604, 606) hosting an instance of Application a (102); (vi) an instance of Application a (102) hosted on the virtual machine (604, 606) processes the received request and determines further processing is required by an instance of Application b (414); (vii) the instance of Application a (102) generates a new request which is addressed and sent using a defined destination port and destination IP address to an instance of a distributed SDC (104) hosted on Virtual Machine d (608) of the same physical server (600); (viii) the instance of the distributed SDC (104) receives the new request at its service access point, which confirms the new request for processing by checking that the new request is addressed to the defined destination port; (ix) the service routing component of the instance of the distributed SDC (104) determines a destination server (408, 410, 412) hosting an instance of Application b (404) using a defined service policy; (x) the destination host addressing component of the instance of the distributed SDC (104) determines a TCP port and an IP address for the destination server (408, 410, 412) determined in (ix); (xi) the new request, having been processed by the instance of the distributed SDC (104) and addressed accordingly, is sent to a network protocol stack associated with the physical server (600); (xii) the new request is sent from the physical server (600) to the destination server (408, 410, 412) determined by the instance of the distributed SDC (104); (xiii) the new request is received by the destination server and is processed by an instance of Application b (414); (xiv) the instance of Application b (414) generates a response as a result of processing the received new request; (xv) the generated response is sent from the destination server (408, 410, 412) to the virtual machine (604, 606) hosting the instance of Application a (102) on the physical server (500); and (xvi) the instance of Application a (102) uses the generated response provided by the destination server (408, 410, 412) to respond to the initial client request.

Figure 7:
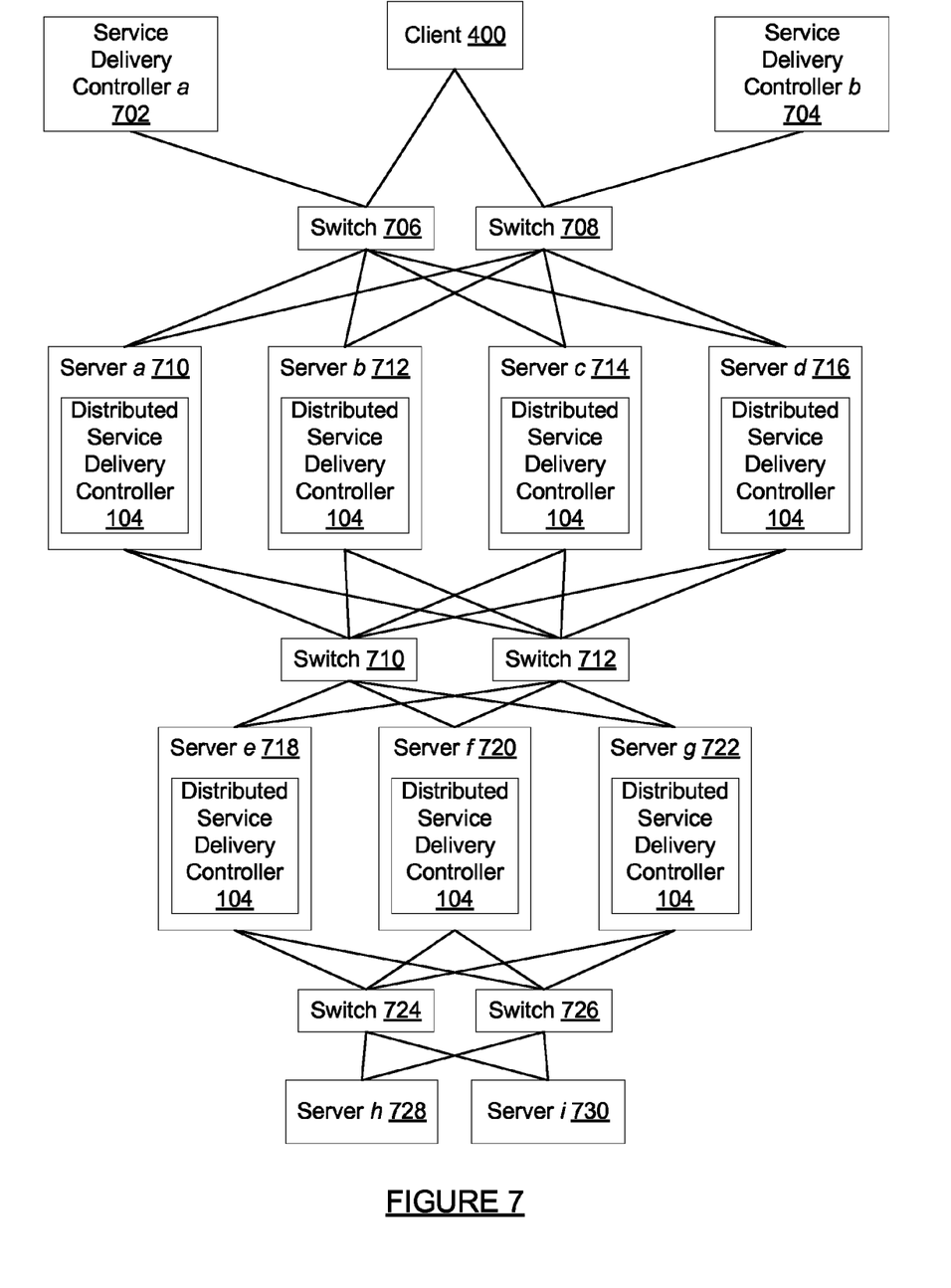

FIG. 7 shows an example in accordance with one or more embodiments of the invention. Specifically, FIG. 7 illustrates connectivity requirements in a multi-tiered network. In this example, three tiers of servers are configured in a data center: a first tier includes physical servers a, b, c, and d (710-716); a second tier includes physical servers e, f, and g (718-722); and a third tier includes physical servers h and i (728, 730). In addition, FIG. 7 shows a pair of non-distributed SDCs (702 and 704) that are configured to route requests from a client to one of the first tier physical servers (710-716). The routing between the first tier physical servers and the second tier physical servers is provided by instances of a distributed SDC (104) hosted on each of the first tier physical servers. (710-716). Further, the routing between the second tier physical servers (718-722) and the third tier physical servers (728 and 730) is provided by instances of the distributed SDC (104) hosted on the second tier physical servers (718-722). Through the utilization of all these network features, a client is able to issue a request to a first tier server (710-716), and receive a response as a function of processing, content retrieval, or a combination of both with respect to applications hosted on first, second, and third tier physical servers. Those skilled in the art will appreciate that the functions performed by each of the components shown in FIG. 7 are the same as those discussed above with respect to each type of component.

Using a software-implemented distributed SDC, hosted on a physical server, as opposed to a physical non-distributed SDC device, allows for network traffic to effectively pass between adjacent network tiers using fewer physical devices. FIG. 7 helps to illustrate this by presenting a comparison of the physical devices required in connecting the client (400) with the first tier (710-716) and the physical devices required in connecting the first tier (710-716) with the second tier (718-722). For example, sending a request from the client (400) to Server a (710) requires the request to travel through both a switch device (706 or 708) and a non-distributed SDC (702 or 704). However, when that same request travels from Server a (710) to, say, Server e (718) it needs only to travel through a switch device (710 or 712). As such, two non-distributed SDCs (702, 704) and two switch devices (706, 708) act to connect the client (400) to the first tier infrastructure (710-716). In contrast, only two switch devices (710, 712) are required to connect the first tier (710-716) to the second tier (718-722) because software-implemented distributed SDCs (104) are used in lieu of physical non-distributed SDCs (702, 714). In a multi-tiered network, the use of fewer physical devices allows for a much simpler network topology with fewer nodes. As such, fewer physical networked devices provides reduced maintenance and electricity consumption.

Using a software-implemented distributed SDC also provides greater security and control in managing the network. The routing functionality is effectively residing within the physical server along with the application that originates the request. As such, the addressing information required in performing the routing is maintained within the physical server instead of with an external device operatively connected to the network. Further, the routing functionality is performed in closer proximity to the sending application and, as such, can be defined with a greater granularity.

Finally, a software implementation allows for easier maintenance and duplicability in deployment. Administrative measures, such as redefining a service policy for example, can be achieved by collectively configuring several distributed SDCs with one remotely-executed command in lieu of manually configuring several individual non-distributed SDCs.

Figure 8:
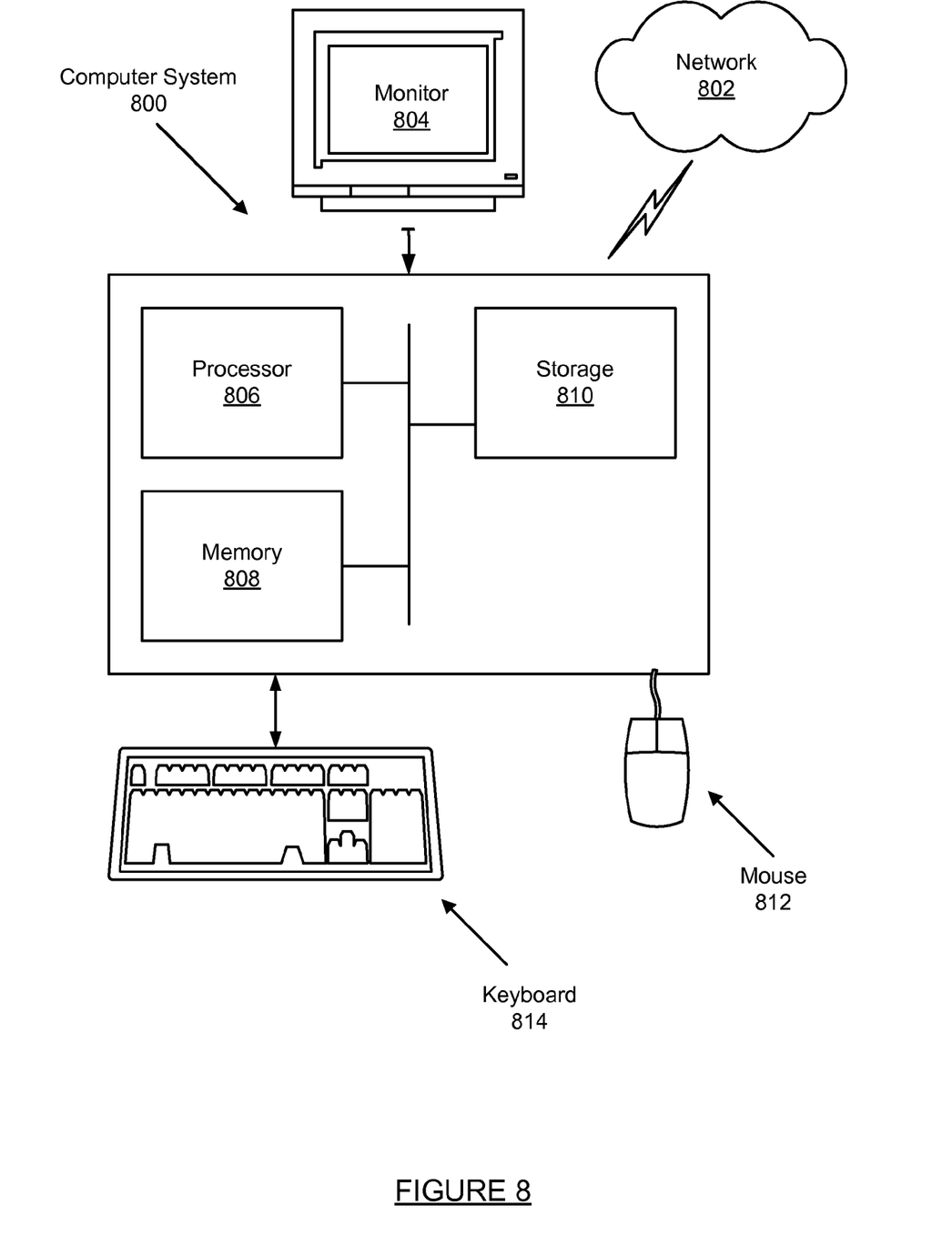
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more processors (806), associated memory (808) (e.g., random access memory (RAM), cache memory, flash memory, etc.), a storage device (810) (e.g., a hard disk, an optical drive such as a compact disk drive or digital video disk (DVD) drive, a flash memory stick, etc.), and numerous other elements and functionalities typical of today's computers (not shown). The computer (800) may also include input means, such as a keyboard (814), a mouse (812), or a microphone (not shown). Further, the computer (800) may include output means, such as a monitor (804) (e.g., a liquid crystal display (LCD), a plasma display, or cathode ray tube (CRT) monitor). The computer system (800) may be connected to a network (802) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, those skilled in the art will appreciate that elements of the invention may execute in the native operating environment of a computer system as well as in a virtualized operating environment hosted on a computer system. Native operating environments may include, but are not limited to, Solaris™ operation system or any other type of an operating system. (Solaris™ is a trademark of Sun Microsystems, Inc. of Menlo Park, Calif.). An example of an embodiment of the invention executing in a native operating environment is provided with Physical Server a (404) as shown in FIG. 4. Virtualized operating environments may include, but are not limited to, Xen®, VMware®, or any other type of virtual machine implementation. (Xen®) is a registered trademark of Citrix Systems, Inc. of Fort Lauderdale, Fla.; VMware® is a registered trademark of VMWare, Inc. of Palo Alto, Calif.) An example of an embodiment of the invention executing in a virtualized operating environment hosted on a computer system is provided with Physical Server b (406) as shown in FIG. 4.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for processing a request sent over a network, comprising: a physical server, comprising: a first instance of a distributed SDC hosted on a first virtual machine executing on the physical server, comprising: a service access point component configured to receive a first request sent by a client over the network and further configured to process the first request when the port to which the first request is addressed corresponds with a port associated with the distributed SDC; a service routing component configured to determine a second virtual machine hosting a first instance of a first application; a destination host addressing component configured to determine a first destination IP address and a first destination port associated with the second virtual machine; the first instance of the first application hosted on the second virtual machine executing on the physical server, wherein the first instance of the first application is configured to receive and process the first request to generate a second request for processing by a first instance of a second application; a second instance of the distributed SDC hosted on a third virtual machine executing on the physical server, comprising: the service access point component configured to receive the second request sent by the client over the network and further configured to process the second request when the port to which the second request is addressed corresponds with a port associated with the distributed SDC; the service routing component configured to determine a first destination server hosting the first instance of the second application; the destination host addressing component configured to determine a second destination port and a second destination IP address associated with the first destination server; and the first destination server, comprising: the first instance of the second application hosted on the first destination server, wherein the first instance of the second application is configured to receive and process the second request, and wherein the first instance of the second application is further configured to generate and send a first response to the physical server as a function of processing the second request, wherein the physical server is configured to process the second request using a network protocol stack to obtain the processed second request, and wherein the physical server is further configured to send the processed second request to the first destination server.

2. The system of claim 1, wherein the physical server further comprises: a second instance of the first application hosted on a fourth virtual machine executing on the physical server, wherein the second instance of the first application is configured to receive and process a third request sent by the client over the network to generate a fourth request for processing by the first instance of the second application, wherein the third request is first received by the first instance of the distributed SDC before it is sent by the first instance of the distributed SDC to the second instance of the first application, wherein the fourth request is received by the service access point component of the second instance of the distributed SDC, wherein the fourth request is selected for processing by the second instance of the distributed SDC when the port to which the fourth request is addressed corresponds with a port associated with the distributed SDC, wherein the service routing component of the second instance of the distributed SDC determines the first destination server hosting the first instance of the second application, wherein the destination host addressing component of the second instance of the distributed SDC determines the second destination port and the second destination IP address associated with the first destination server, wherein the physical server is configured to process the fourth request using the network protocol stack of the physical server to obtain the processed fourth request, wherein the physical server is further configured to send the processed fourth request to the first destination server, and wherein the first instance of the second application hosted on the first destination server is configured to receive and process the fourth request, and wherein the first instance of the second application is further configured to generate and send a second response to the physical server as a function of processing the fourth request.

3. The system of claim 2, further comprising: a second destination server comprising: a second instance of the second application hosted on the second destination server, wherein the second instance of the second application is configured to receive and process a sixth request, and wherein the second instance of the second application is further configured to generate and send a third response to the physical server as a function of processing the sixth request, wherein a fifth request sent by the client over the network is first received by the first instance of the distributed SDC before it is sent by the first instance of the distributed SDC to the first instance of the first application, wherein the fifth request is received, by the first instance of the first application, and processed to generate the sixth request for processing by the second instance of the second application, wherein the sixth request is received by the service access point component of the second instance of the distributed SDC, wherein the sixth request is selected for processing by the second instance of the distributed SDC when the port to which the sixth request is addressed corresponds with a port associated with the distributed SDC, wherein the service routing component of the second instance of the distributed SDC determines the second destination server hosting the second instance of the second application, wherein the destination host addressing component of the second instance of the distributed SDC determines a third destination port and a third destination IP address for the second destination server, wherein the physical server is configured to process the sixth request using the network protocol stack of the physical server to obtain the processed sixth request and wherein the physical server is further configured to send the processed sixth request to the second destination server.

4. The system of claim 1, wherein the service routing component of the first instance of the distributed SDC uses a load balancing policy to determine a virtual machine hosting an instance of a first application, and wherein the service routing component of the second instance of the distributed SDC uses the load balancing policy to determine a destination server hosting an instance of a second application.

* * * * *